(No Model.)

C. H. POND.
CIRCUIT CONTROLLER FOR SELF WINDING CLOCKS.

No. 362,902. Patented May 10, 1887.

Witnesses
Geo. W. Breck
Carrie E. Ashley

Inventor
Chester H. Pond
By his Attorneys
Pope & Edgcomb

UNITED STATES PATENT OFFICE.

CHESTER H. POND, OF BROOKLYN, NEW YORK.

CIRCUIT-CONTROLLER FOR SELF-WINDING CLOCKS.

SPECIFICATION forming part of Letters Patent No. 362,902, dated May 10, 1887.

Application filed February 4, 1887. Serial No. 226,520. (No model.)

*To all whom it may concern:*

Be it known that I, CHESTER H. POND, a citizen of the United States, residing in Brooklyn, in the county of Kings and State of New York, have invented certain new and useful Improvements in Circuit-Controllers for Electric Clocks, of which the following is a specification.

The invention relates to certain improvements in the construction of self-winding electric clocks, and it relates especially to the class in which rotary electric motors are employed for periodically winding the clock-springs.

The object of the present invention is to provide convenient and reliable means for periodically closing the circuit-connections through the motor, insuring that the circuit shall be completed through reliable contact-points in a sudden and quick manner at the proper moment, and that it shall be interrupted in a like manner after the clock is wound, and, further, that the circuit shall be interrupted after a predetermined time, even though the battery should for any reason fail to wind the clock.

The invention involves certain details in the construction of the clock itself and the application thereto of the circuit-controlling device, and these will be described in connection with the accompanying drawings.

Figure 1:
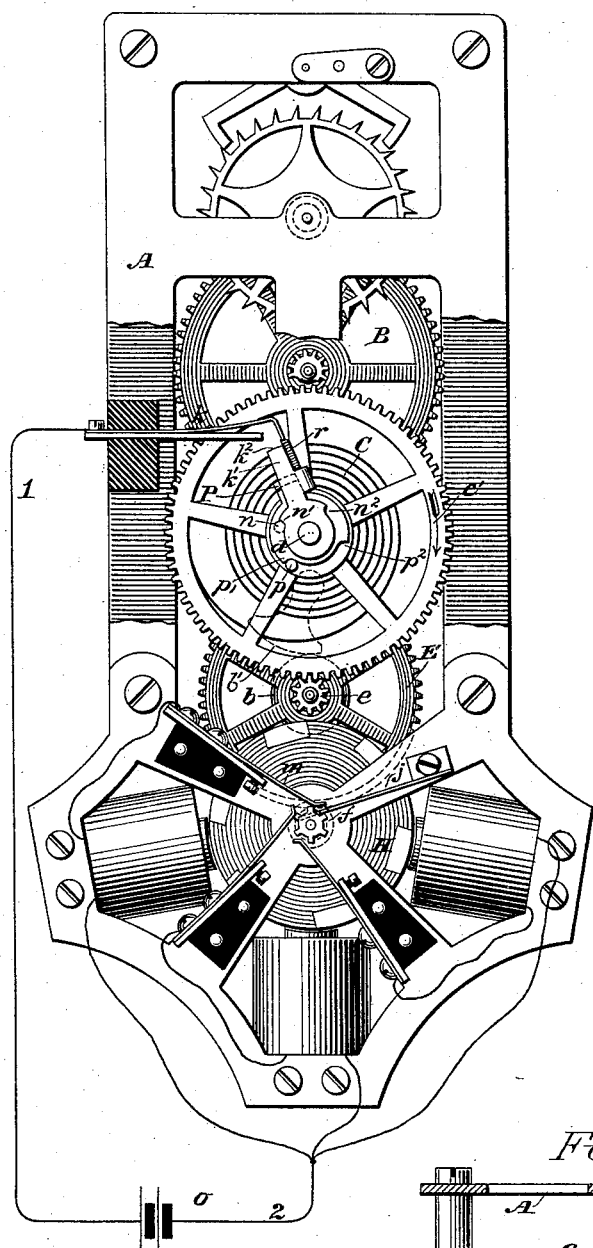
Figure 2:
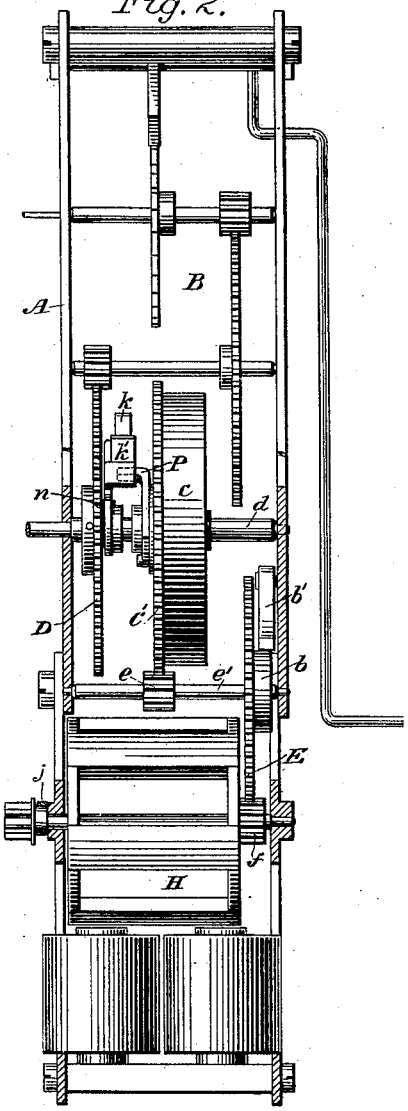
Figure 3:
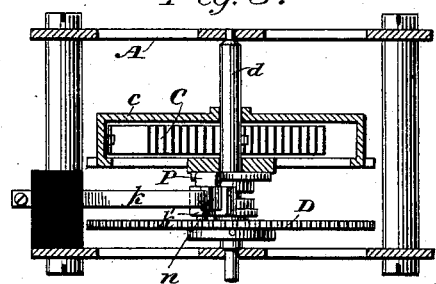

In the drawings, Figure 1 is a front view, partly in section, of a clock embodying the features of the invention, and Fig. 2 is a transverse section of the same. Fig. 3 is a plan section.

Referring to the figures, A represents the frame of the clock, and B a train of any suitable character. This is driven by a spring, C, contained in a drum, $c$, provided with a wheel, $c'$, rigid therewith. The spring C is fastened at its inner end to a shaft or arbor, $d$, of the minute-hand. The outer end of the spring is fastened to the drum and its wheel, the latter being loosely mounted upon the arbor. The main wheel D of the train is mounted rigidly upon the arbor in the usual manner. It is desired that the wheel $c'$ be turned in the direction of the arrow at regular intervals to wind the spring sufficiently to compensate for the amount which it is unwound during a predetermined period. This is accomplished by gearing the wheel $c'$ with a pinion, $e$, which is fixed upon an arbor, $e'$. This arbor carries a wheel, E, gearing with a pinion, $f$, upon the shaft of the armature of an electric motor, H. This motor is of the same general character as is described in Letters Patent No. 308,521, issued to me on the 25th day of November, 1884.

It is evident that at predetermined intervals the circuit of the motor should be closed a sufficient time to allow the spring to be wound. This is accomplished by means of the device now to be described. One pole of a battery, $o$, is connected by conductor 1, with an insulated contact-spring, $k$. The end of this spring is bent down into the path of an arm, $k'$, loosely mounted upon the arbor $d$. This arm is capable of turning the greater portion of the distance round the arbor, independently of the arbor and wheel D; but two shoulders, $n'$ $n^2$, upon the arm are engaged by a pin, $n$, projecting from the face of the wheel D.

As the clock-spring is gradually unwound by the movement of the train, the pin $n$ strikes the shoulder $n'$ and carries the arm with it until it comes beneath the circuit-closing spring $k$. This continues the circuit-connections through the arm, the frame of the clock, a friction-spring, $j$, pressing against the motor-shaft, one of the contact-springs $m$, the corresponding coils of the motor, and a conductor, 2, to the other pole of the battery. The motor being thus actuated the armature will revolve, thus causing the wheel C' to be driven forward and to wind the spring C. The spring $j$ serves to continue the circuit-connections to the motor-shaft independently of the arbors of the clock mechanism, thus avoiding the danger of injury to the oil in the bearings by reason of the passage of the current.

Upon the sleeve of the wheel C' there is carried a loose arm, P, which is designed to separate the circuit-closing arm $k'$ from the spring $k$ when the spring C has been wound to a predetermined tension. For this purpose the arm projects into the path of the circuit-closing arm $k'$, and is caught up by a pin, $p$, engaging a shoulder, $p'$, upon the arm P. The arm P will thus be driven against the arm $k'$ and force it forward from beneath the spring $k$, thus interrupting the circuit-connections. It will be readily understood that the arm $k'$ may be advanced independently of the clock-movement and the wheel D, because of the distance which it is allowed to move before the pin $n$ will engage the shoulder $n^2$.

The width of the face of the contact-point $k^2$ upon the arm $k'$ is such that the normal operation of the clock will not carry it from beneath the contact-spring $k$, for the space of, say, one minute, so that sufficient time is allowed for the clock to wind. Should, however, there be any failure on the part of the clock to be wound by its motor, the arm will be carried forward a sufficient distance to separate it from the contact-spring. This is permitted by reason of the fact that the arm P may be carried forward until it is stopped by the pin $p$ striking the shoulder $p^2$, so that it cannot by any possibility block the movement of the arm $k'$ in such position as to hold it in contact with the contact-spring $k$, and thus cause the battery to run down.

It is desirable that the spring $k$ should make quick and sudden contact with the arm $k'$, and that its separation therefrom should be as quick as possible. For this purpose a shield of non-conducting material—such, for instance, as ivory—is placed in front of the circuit-closing arm, as shown at $r$. This projects slightly above the face $k^2$, and comes first into contact with the spring $k$. By reason of this, contact is not made with the face of the contact-plate until the spring escapes over the end of the piece of ivory. The interruption of the circuit will be quick, by reason of the quick movement of the motor, which will carry the arm $k'$ forward until it is beyond the spring.

For the purpose of preventing a backward movement of the motor there is employed a friction or cam brake, $b'$. This is loosely pivoted to the frame above the shaft $e$, and is constructed with a cam-face, the curve of which is eccentric from the point of its support. When the motor is driven forward, the shaft $e'$ is driven toward the left hand, Fig. 1, and the brake does not interfere with its movement; but were the motor to revolve in the opposite direction the brake would bind against a smooth disk, $b$, upon the arbor $e'$. This will immediately lock the arbor, and thus the motor.

I claim as my invention—

1. In a self-winding electric clock, a circuit-closing device consisting of a contact-spring, an arm moving with the driving-wheel of the clock and carried thereby into contact with said contact-spring, and an arm mounted loosely upon the arbor of the driving-wheel, and a pin moving with the winding device, engaging the second arm and causing it to engage the first-named arm and carry it out of contact with said contact-spring when a predetermined amount of winding is accomplished.

2. In an electric clock, a winding device and a circuit-closer therefor, consisting of an arm advanced by the clock-train, a spring applied to said arm, means for permitting a further advance of the arm independently of the clock-train, a wheel driven by the winding device, an arm moving therewith and engaging the first-named arm after a predetermined tension of the spring has been secured, and means for permitting the latter arm to move independently of the winding device.

3. In a circuit-closer for electric clocks, the combination of the driving-wheel of the clock, a contact-arm loosely mounted upon its arbor and moved by the driving-wheel, a contact-spring projecting into the path of said arm, and an insulated contact-surface which engages said arm as it approaches said spring, and from which it escapes into contact with said arm.

4. In an electric clock, the circuit-controlling device consisting of the contact-spring $k$, the arbor $d$, the wheel D, secured thereto, the arm $k'$, having the shoulders $n'$ and $n^2$, the pin $n$ engaging said arm for carrying it into contact with said contact-spring, the loosely-mounted arm P, and the pin $p$, engaging the latter and tripping the arm $k'$.

5. In an electric clock having a rotary electric motor for winding it, and commutator-springs applied to the commutator thereof, an independent contact-spring in electrical connection with the frame of the clock and bearing constantly against the shaft or the commutator of the motor.

In testimony whereof I have hereunto subscribed my name this 21st day of January, A. D. 1887.

CHESTER H. POND.

Witnesses:
DANL. W. EDGECOMB,
CHARLES A. TERRY.